United States Patent
Shen et al.

(10) Patent No.: US 12,231,984 B1
(45) Date of Patent: Feb. 18, 2025

(54) PING PONG ROAMING IDENTIFICATION AND PROCESSING IN WIRELESS LOCAL AREA NETWORK

(71) Applicant: TP-Link Systems Inc., Irvine, CA (US)

(72) Inventors: Dong Shen, Chengdu (CN); Yang Jiang, Shenzhen (CN); Rui Wang, Shenzhen (CN); Bin He, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/829,247

(22) Filed: Sep. 9, 2024

(51) Int. Cl.
*H04W 36/30* (2009.01)
*H04W 36/00* (2009.01)
*H04W 36/08* (2009.01)
H04W 84/12 (2009.01)

(52) U.S. Cl.
CPC ..... *H04W 36/302* (2023.05); *H04W 36/0069* (2018.08); *H04W 36/0072* (2013.01); *H04W 36/08* (2013.01); H04W 84/12 (2013.01)

(58) Field of Classification Search
CPC ..... H04W 36/0085; H04W 36/008375; H04W 36/0094; H04W 36/08; H04W 36/0077; H04W 36/0055; H04W 36/0069; H04W 36/302; H04W 84/12; H04W 36/30
See application file for complete search history.

(56) References Cited

U.S. PATENT DOCUMENTS

| | | | |
|---|---|---|---|
| 9,125,107 B1* | 9/2015 | McMullen | H04W 64/00 |
| 2015/0172982 A1* | 6/2015 | Park | H04W 36/38 370/332 |
| 2017/0127330 A1* | 5/2017 | Payyappilly | H04W 36/0061 |
| 2023/0091127 A1 | 3/2023 | Lin | |

* cited by examiner

*Primary Examiner* — Allahyar Kasraian
(74) *Attorney, Agent, or Firm* — Loeb & Loeb LLP

(57) ABSTRACT

This disclosure provides a method for ping pong roaming control performed by an access point (AP), a method for ping pong roaming control performed by a controller, an AP, a controller, a non-transitory computer readable storage medium and a computer program product for processing/identifying ping pong roaming. The method for ping pong roaming control, performed by an AP includes: determining association switching behaviors of a station (STA) based on association and/or disassociation behaviors of the STA; identifying one or more connection instability events of the STA based on the association switching behaviors of the STA; and reporting at least one of the one or more connection instability events of the STA to a controller for the controller to identify a ping pong roaming event of the STA between multiple APs.

16 Claims, 8 Drawing Sheets

PING PONG ROAMING IDENTIFICATION AND PROCESSING IN WIRELESS LOCAL AREA NETWORK

TECHNICAL FIELD

The present disclosure relates to wireless local area network (WLAN) communication, and more specifically, to a method, an access point (AP) for ping pong roaming control in a wireless local area network, a non-transitory computer readable medium and a program product.

BACKGROUND

With the development of communication technology, wireless local area network (WLAN) technology based on IEEE 802.11 standard has been widely used. WLAN technology allows wireless access at home or in enterprises or at a specific service provision region using client devices, such as a mobile phone, a personal digital assistant (PDA), a laptop computer, a portable multimedia player (PMP), etc. on the basis of radio frequency (RF) technology.

When a wireless client device (or called as station (STA)) moves between access points (APs), if the signal strength of an AP fluctuates greatly due to environmental interference, signal attenuation or unstable AP performance, the client device may frequently try to reconnect to one or more APs, resulting in frequently and unnecessarily switching connections between multiple APs, like a "ping pong" sport, and thus this phenomenon is called "ping pong" handover or "ping pong" roaming phenomenon. Ping pong roaming may lead to network performance degradation, poor user experience, increased terminal energy consumption, increased network management complexity, and potential security risks. Thus, it is necessary to identify the ping pong roaming phenomenon and control and avoid the ping pong roaming phenomenon.

SUMMARY

The present disclosure provides techniques for ping pong roaming control to control or avoid the ping pong roaming phenomenon of the station (STA), so as to solve the problems of frequent association switching, disconnection, packet loss, poor network connection stability and so on, and then improve the user experience.

According to an aspect of the present disclosure, there is provided a method for ping pong roaming control, the method being performed by an access point (AP) and comprising:
  determining association switching behaviors of a STA based on association and/or disassociation behaviors of the STA;
  identifying one or more connection instability events of the STA based on the association switching behaviors of the STA; and
  reporting at least one of the one or more connection instability events of the STA to a controller for the controller to identify a ping pong roaming event of the STA between multiple APs.

In at least one embodiment, the determining association switching behaviors of the STA based on association and/or disassociation behaviors of an STA comprises: determining one of the association switching behaviors of the STA in response to that: the STA associates with a first AP different from the AP within a first time period after the STA disassociates from the AP; the STA associates with the AP within a second time period after the STA disassociates from the AP; or the STA disassociates from the AP.

In at least one embodiment, the identifying one or more connection instability events of the STA based on the association switching behaviors of the STA comprises:
  identifying one of the one or more connection instability events of the STA in response to that:
  a number of the association switching behaviors of the STA occurring within a third time period is greater than a first number threshold; or
  a number of the association switching behaviors of the STA occurring within a fourth time period starting from when the STA associates with the AP is greater than a second number threshold.

In at least one embodiment, the method further comprises:
  recording any connection instability event meeting a filter condition among the one or more connection instability events in a connection instability event list,
  wherein the reporting at least one of the one or more connection instability events of the STA to a controller for the controller to identify ping pong roaming of the STA comprises reporting the connection instability event(s) in the connection instability event list in response to a reporting condition being met; and
  wherein the method further comprises clearing the connection instability event list after the connection instability event(s) in the connection instability event list is(are) reported.

In at least one embodiment, the filter condition comprises:
  a condition in which the connection instability event occurs within a first area,
  wherein the first area is an area in which an average value of received signal strength indicators (RSSIs) for the association switching behaviors corresponding to the connection instability event is lower than a first RSSI threshold; or
  the first area is an area in which every of the RSSIs for the association switching behaviors corresponding to the connection instability event is lower than a second RSSI threshold.

In at least one embodiment, the filter condition comprises:
  a condition in which the connection instability event occurs while an RSSI standard deviation for each of the association switching behaviors of the STA corresponding to the connection instability event is lower than a first RSSI standard deviation threshold, or an average value of the RSSI standard deviations for the association switching behaviors of the STA corresponding to the connection instability event is lower than a second RSSI standard deviation threshold.

In at least one embodiment, the filter condition comprises:
  a condition in which the connection instability event is not caused by basic service set (BSS) transition management (BTM).

In at least one embodiment, the reporting condition comprises one or more of:
  a reporting period being reached;
  one of the one or more connection instability events of the STA being identified; or
  an instruction for reporting the connection instability event being received.

In at least one embodiment, the method further comprises:
  receiving a first ping pong roaming processing related instruction from the controller; and
  executing ping pong roaming processing operations based on the received first ping pong roaming processing instruction.

In at least one embodiment, the ping pong roaming processing operations comprises one or more of:
increasing or decreasing transmission power of the AP;
turning on or turning off an access control of the AP for the STA to forbid or to allow the AP to respond to the STA's access request(s);
turning on or turning off a sticky control of the AP for the STA to keep or not to keep the STA to be able to associated with the AP more stable; or
turning on or turning off a roaming control of the AP for the STA to exclude or not to exclude target APs to be recommended by the AP to be associated with the STA to make sure that the STA will not be or can be recommended to be associated with the excluded target APs (e.g. the APs which turn on access control for the STA as described above).

In at least one embodiment, the method further comprises:
cancelling the ping pong roaming processing operations in response to that a ping pong roaming processing operations cancelling condition is met.

In at least one embodiment, the ping pong roaming processing operations cancelling condition comprises one or more of:
a cancelling condition that an accumulated time period for execution of the ping pong roaming processing operations is longer than a cancelling time threshold and a ping pong roaming processing operations non-extension condition is met;
a cancelling condition that the STA leaves the area in which the ping pong roaming event is identified;
a cancelling condition that a transmission power change of the AP is larger than a power change threshold;
a cancelling condition that another ping pong roaming event of the STA occurs between multiple APs;
a cancelling condition that a user cancels the execution of the ping pong roaming processing operations;
a cancelling condition that a user turns off the function of the ping pong roaming control;
a cancelling condition that the AP is power off (e.g. the AP is turned off, or all the radios of the AP are turned off); or
a cancelling condition that the connection between the AP and the controller is lost for a given time.

According to another aspect of the present disclosure, there is provided a method for ping pong roaming control, the method being performed by a controller and comprising:
receiving one or more connection instability events of one or more STAs from one or more APs;
identifying a ping pong roaming event of a first STA of the one or more STAs based on the one or more connection instability events;
determining a ping pong roaming processing strategy for the first STA; and
transmitting a ping pong roaming processing instruction to at least one AP of the one or more APs to perform ping pong roaming processing operations based on the determined ping pong roaming processing strategy.

In at least one embodiment, the identifying a ping pong roaming event of a first STA of the one or more STAs based on the one or more connection instability events comprises identifying the ping pong roaming event of the first STA in response to one or more of:
a condition in which there are a plurality of APs reporting two or more connection instability events of the first STA, and a time interval between any two consecutive connection instability events from different APs of the two or more connection instability events is shorter than a first time interval threshold;
a condition in which there are a plurality of APs reporting two or more connection instability events of the first STA, and a time interval between two consecutive connection instability events from different APs of the two or more connection instability events is shorter than a second time interval threshold; or
a condition in which an AP reports a connection instability event of the first STA.

In at least one embodiment, the determining a ping pong roaming processing strategy for the first STA is performed based on attributes of the one or more connection instability events of the one or more STAs and/or wireless specification or radio frequency parameters of the one or more APs, and/or
the ping pong roaming processing strategy comprises:
which AP(s) need to execute ping pong roaming processing operations; and/or
operations of the ping pong roaming processing for each AP which needs to execute the ping pong roaming processing operations.

According to yet another aspect of the present disclosure, there is provided an AP for ping pong roaming control, the AP comprising:
one or more processors;
a memory coupled to at least one of the processors; and
a set of computer program instructions stored in the memory, which, when executed by at least one of the processors, perform actions of:
determining association switching behaviors of a STA based on association and/or disassociation behaviors of the STA;
identifying one or more connection instability events of the STA based on the association switching behaviors of the STA; and
reporting at least one of the one or more connection instability events of the STA to a controller for the controller to identify a ping pong roaming event of the STA between multiple APs.

The set of computer program instructions stored in the memory, when executed by at least one of the processors, perform the determining association switching behaviors of the STA based on association and/or disassociation behaviors of an STA by:
determining one of the association switching behaviors of the STA in response to that:
the STA associates with a first AP different from the AP within a first time period after the STA disassociates from the AP;
the STA associates with the AP within a second time period after the STA disassociates from the AP; or
the STA disassociates from the AP.

In at least one embodiment, the set of computer program instructions stored in the memory, when executed by at least one of the processors, perform the identifying one or more connection instability events of the STA based on the association switching behaviors of the STA by:
identifying one of the one or more connection instability events of the STA in response to that:
a number of the association switching behaviors of the STA occurring within a third time period is greater than a first number threshold; or
a number of the association switching behaviors of the STA occurring within a fourth time period starting from when the STA associates with the AP is greater than a second number threshold.

In at least one embodiment, the set of computer program instructions stored in the memory, when executed by at least one of the processors, further perform:
  recording any connection instability event meeting a filter condition among the one or more connection instability events in a connection instability event list,
  wherein the reporting at least one of the one or more connection instability events of the STA to a controller for the controller to identify ping pong roaming of the STA comprises reporting the connection instability event(s) in the connection instability event list in response to a reporting condition being met; and
  wherein the method further comprises clearing the connection instability event list after the connection instability event(s) in the connection instability event list is(are) reported.

In at least one embodiment, the filter condition comprises:
  a condition in which the connection instability event occurs within a first area,
  wherein the first area is an area in which an average value of received signal strength indicators (RSSIs) for the association switching behaviors corresponding to the connection instability event is lower than a first RSSI threshold; or
  the first area is an area in which every of the RSSIs for the association switching behaviors corresponding to the connection instability event is lower than a second RSSI threshold.

In at least one embodiment, the filter condition comprises:
  a condition in which the connection instability event occurs while an RSSI standard deviation for each of the association switching behaviors of the STA corresponding to the connection instability event is lower than a first RSSI standard deviation threshold, or an average value of the RSSI standard deviations for the association switching behaviors of the STA corresponding to the connection instability event is lower than a second RSSI standard deviation threshold.

In at least one embodiment, the filter condition comprises:
  a condition in which the connection instability event is not caused by basic service set (BSS) transition management (BTM).

In at least one embodiment, the reporting condition comprises one or more of:
  a reporting period being reached;
  one of the one or more connection instability events of the STA being identified; or
  an instruction for reporting the connection instability event being received.

In at least one embodiment, the set of computer program instructions stored in the memory, when executed by at least one of the processors, further perform:
  receiving a first ping pong roaming processing related instruction from the controller; and
  executing ping pong roaming processing operations based on the received first ping pong roaming processing instruction.

In at least one embodiment, the ping pong roaming processing operations comprises one or more of:
  increasing or decreasing transmission power of the AP;
  turning on or turning off an access control of the AP for the STA to forbid or to allow the AP to respond to the STA's access request(s);
  turning on or turning off a sticky control of the AP for the STA to keep or not to keep the STA to be able to associated with the AP more stable; or
  turning on or turning off a roaming control of the AP for the STA to exclude or not to exclude target APs to be recommended by the AP to be associated with the STA to make sure that the STA will not be or can be recommended to be associated with the excluded target APs (e.g. the APs which turn on access control for the STA as described above).

In at least one embodiment, the set of computer program instructions stored in the memory, when executed by at least one of the processors, further perform:
  cancelling the ping pong roaming processing operations in response to that a ping pong roaming processing operations cancelling condition is met.

In at least one embodiment, the ping pong roaming processing operations cancelling condition comprises one or more of:
  a cancelling condition that an accumulated time period for execution of the ping pong roaming processing operations is longer than a cancelling time threshold and a ping pong roaming processing operations non-extension condition is met;
  a cancelling condition that the STA leaves the area in which the ping pong roaming event is identified;
  a cancelling condition that a transmission power change of the AP is larger than a power change threshold;
  a cancelling condition that another ping pong roaming event of the STA occurs between multiple APs;
  a cancelling condition that a user cancels the execution of the ping pong roaming processing operations;
  a cancelling condition that a user turns off the function of the ping pong roaming control;
  a cancelling condition that the AP is power off; or
  a cancelling condition that the connection between the AP and the controller is lost for a given time.

According to yet another aspect of the present disclosure, there is provided a controller for ping pong roaming control, comprising:
  one or more processors;
  a memory coupled to at least one of the processors; and
  a set of computer program instructions stored in the memory, which, when executed by at least one of the processors, perform actions of:
  receiving one or more connection instability events of one or more STAs from one or more APs;
  identifying a ping pong roaming event of a first STA of the one or more STAs based on the one or more connection instability events;
  determining a ping pong roaming processing strategy for the first STA; and
  transmitting a ping pong roaming processing instruction to at least one AP of the one or more APs to perform ping pong roaming processing operations based on the determined ping pong roaming processing strategy.

In at least one embodiment, the set of computer program instructions stored in the memory, when executed by at least one of the processors, perform: the identifying a ping pong roaming event of a first STA of the one or more STAs based on the one or more connection instability events by identifying the ping pong roaming event of the first STA in response to one or more of:
  a condition in which there are a plurality of APs reporting two or more connection instability events of the first STA, and a time interval between any two consecutive connection instability events from different APs of the two or more connection instability events is shorter than a first time interval threshold;

a condition in which there are a plurality of APs reporting two or more connection instability events of the first STA, and a time interval between two consecutive connection instability events from different APs of the two or more connection instability events is shorter than a second time interval threshold; or a condition in which an AP reports a connection instability event of the first STA.

In at least one embodiment, the determining a ping pong roaming processing strategy for the first STA is performed based on attributes of the one or more connection instability events of the one or more STAs and/or wireless specification or radio frequency parameters of the one or more APs, and/or the ping pong roaming processing strategy comprises:
which AP(s) need to execute ping pong roaming processing operations; and/or
operations of the ping pong roaming processing for each AP which needs to execute the ping pong roaming processing operations.

According to yet another aspect of the present disclosure, there is provided a non-transitory computer-readable storage medium having computer instructions stored thereon, wherein the computer instructions, when executed by a processor, cause the processor to perform the method according to any one of embodiments.

According to yet another aspect of the present disclosure, there is provided a computer program product comprising computer instructions, wherein the computer instructions, when executed by a processor, cause the processor to perform the method according to any one of embodiments.

At least based on the above embodiments of the present disclosure, the ping pong roaming phenomenon of the STA can be controlled or avoided, so as to solve the problems of frequent association switching, disconnection, packet loss, poor network connection stability and so on, and then improve the user experience.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
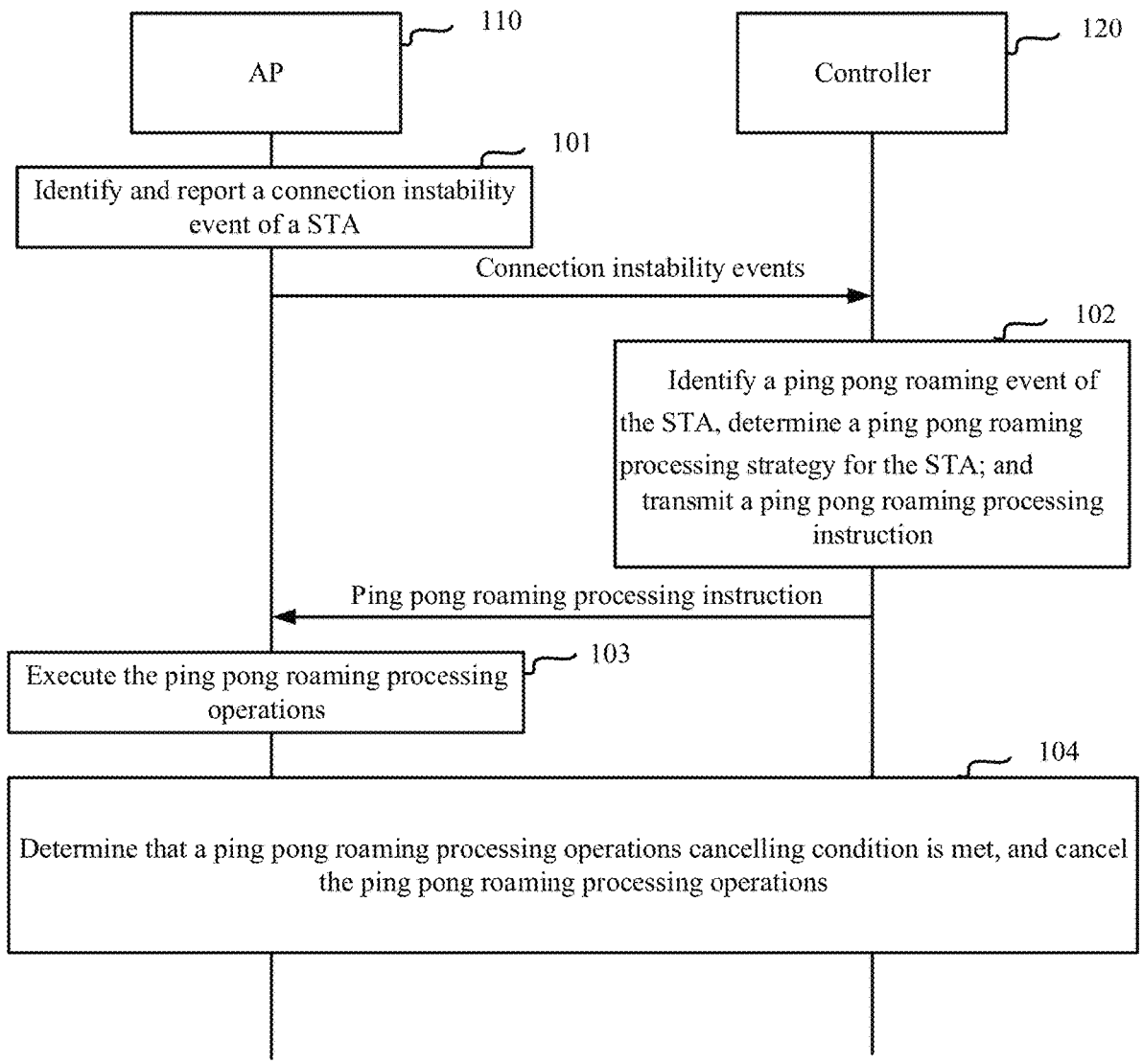
FIG. 1 shows an exemplary block diagram illustrating a ping pong roaming related process of an AP and a controller for implementing at least one embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of said word encompasses those ones listed following the said word and their equivalents, without excluding other elements or objects.

In addition, technical features involved in different embodiments of the present disclosure described below may be combined with each other as long as no conflicts occur therebetween.

A roaming process in the wireless local area network means that a station (STA) or a client device disassociates from one access point (AP) and associates with another AP. The STA constantly monitors the signal strength of the currently connected AP. When the signal strength drops below a certain threshold, the STA starts to consider roaming. The STA starts scanning the surrounding wireless networks to find available APs. The STA may evaluate the signal strength, network load, delay and other factors of other APs around it, and choose a best AP to connect. This decision-making process may be controlled by a driver, firmware or algorithm in an operating system of the STA. After the STA selects a new AP, the STA initiates an association process. In the context of wireless local area networks, "association" refers to the process by which a STA establishes a connection with an AP, involving several steps of negotiation and authentication, ultimately allowing the device to communicate with the wireless local area network and access the Internet or other resources provided by the wireless local area network. After successful association, new encryption keys may be installed between the STA and the new AP to ensure the security of communication. Once the STA successfully establishes a connection with the new AP and installs the necessary keys, the roaming process is completed. After that, the STA can continue to use network services. The "disassociation" refers to the process by which an STA disconnect from an AP by sending to the AP and other STAs a specific disassociation frame including a reason code for explaining the reason of the disconnection.

Roaming modes of the STA include active roaming, passive roaming, and first-disassociation-then-reassociation. Usually, the active roaming of the STA is performing roaming triggering and roaming target selection by the STA itself based on the signal strength, and the signal strength is the only factor to consider, so it is difficult to make the STA roam in time and associate with the best target AP. In addition, due to differences of roaming algorithms between different manufacturers and different devices, the active roaming experience of different clients is very different, which cannot ensure that every client can get a good roaming experience. In the passive roaming, STAs may rely more on APs or network infrastructures to trigger roaming process. For example, when the AP detects that the signal quality of the STA is degraded, the AP may actively send roaming suggestions of target APs to the STA or guide the STA to connect to the target APs. Therefore, the passive roaming can theoretically provide a better roaming experience than active roaming of the STA.

In the roaming mode of first-disassociation-then-reassociation due to losing the connection, the STA disassociates from the original AP first and then associates with other APs. This mode is not seamless association switching, and the user usually faces a long network interruption, so the user experience is usually poor. However, in the roaming mode of active roaming or passive roaming, the STA associates with an AP first before disassociating from the original AP, so it can be regarded as seamless association handover in the case of successful roaming, and the STA usually does not lose the network connection during roaming. Although the user experience of active roaming and passive roaming is much better than that of first-disassociation-then-reassociation, there may still be problems such as packet loss and jamming in the process of disassociation and reassociation (or called association switching), which still cause a negative impact on the user experience.

When a STA moves among multiple APs, if the signal strength of an AP fluctuates greatly or the STA is located in a weak signal overlapping area of multiple APs, the overall signal strength difference between the STA and multiple APS is not large. At this time, the signal strength may suddenly change due to environmental fluctuations, so ping pong roaming may easily occur due to active roaming and disassociation and reassociation. In addition, environmental fluctuation may also lead to unreasonable passive roaming recommendation by the APs due to wrong judgment, so ping pong roaming caused by passive roaming may also occur. Usually, the ping pong roaming caused by the STA walking back and forth between multiple APs can be regarded as an expected normal phenomenon and can be left untreated; however, ping pong roaming caused by environmental fluctuation in the weak signal overlapping area of multiple APs is an unexpected abnormal event and needs to be dealt with.

It is necessary to design a ping pong roaming identification and processing scheme, and identify and process the ping pong roaming phenomenon that the STA roams back and forth between multiple APs due to first-disassociation-then-reassociation due to losing the connection, active roaming, passive roaming or other reasons, so as to solve the problems of frequent association switching, disconnection, packet loss, poor network connection stability and so on, and further improve the user experience.

The traditional way to deal with ping pong roaming is using a controller to collect to identify ping pong roaming based on the association behavior or roaming behavior of the STA, which leads to the inevitable delay of ping pong roaming identification by the controller.

In view of the above problems, the present disclosure provides a method, an AP, a non-transitory computer readable medium and a computer program product for ping pong roaming control so as to avoid a ping pong roaming phenomenon that a STA roams back and forth between a plurality of APs due to first-disassociation-then-reassociation due to losing the connection, active roaming, passive roaming or other reasons. The AP may judge whether the STA has association switching behaviors according to its association and disassociation behaviors, and identify a connection instability event based on its association switching behaviors, (and then record the connection instability event meeting a preset filter condition locally) and report the (recorded) connection instability event to the controller. The controller identifies the ping pong roaming phenomenon according to the unstable connection event reported by the AP, and then executes the ping pong roaming processing strategy judgment to determine a ping pong roaming processing strategy and sends the ping pong roaming processing related instructions to the AP. The AP may perform ping pong roaming processing operations such as power adjustment, access control, sticky control and roaming control according to the instructions related to ping pong roaming processing issued by the controller to alleviate the unstable connection of STA. thereby solving the problems of frequent association switching, disconnection, connection, packet loss, poor network connection stability and the like, and further improving the user experience.

FIG. 1 shows an exemplary block diagram illustrating a ping pong roaming related process of an AP 110 and a controller 120 for implementing at least one embodiment of the present disclosure.

The controller 120 may be a wireless local area network controller or network management system for managing and controlling multiple APs, which may be implemented in hardware, software, firmware or else. The controller 120 may be located in a device separate from the AP, or may be even located in the AP. In some cases, a part of functions of the controller 120 may be performed in the AP, and another part of functions of the controller 120 may be performed partly outside the AP. The implementations of the controller 120 are not limited.

The controller 120 may be wirelessly connected with the AP 110, or may be wired connected with the AP 110.

As shown in FIG. 1, in block 101, the AP 110 may identify and report a connection instability event of a STA to the controller 120. In block 102, the controller 120 may identify a ping pong roaming event of the STA, determine a ping pong roaming processing strategy for the STA; and transmit a ping pong roaming processing instruction to the AP 110. In block 103, the AP 110 may execute the ping pong roaming processing operations. In block 104, the AP 110 and/or the controller 120 and/or a user may determine that a ping pong roaming processing operations cancelling condition is met, and the AP 110 and/or the controller 120 may cancel the ping pong roaming processing operations. During the process, the AP 110 and the controller 120 may transmit ping pong roaming processing related instructions to each other to complete the process. The blocks 101-104 can be executed sequentially or not sequentially, and can be executed in parallel or partly in parallel. Details for each block will be described below.

Figure 2:
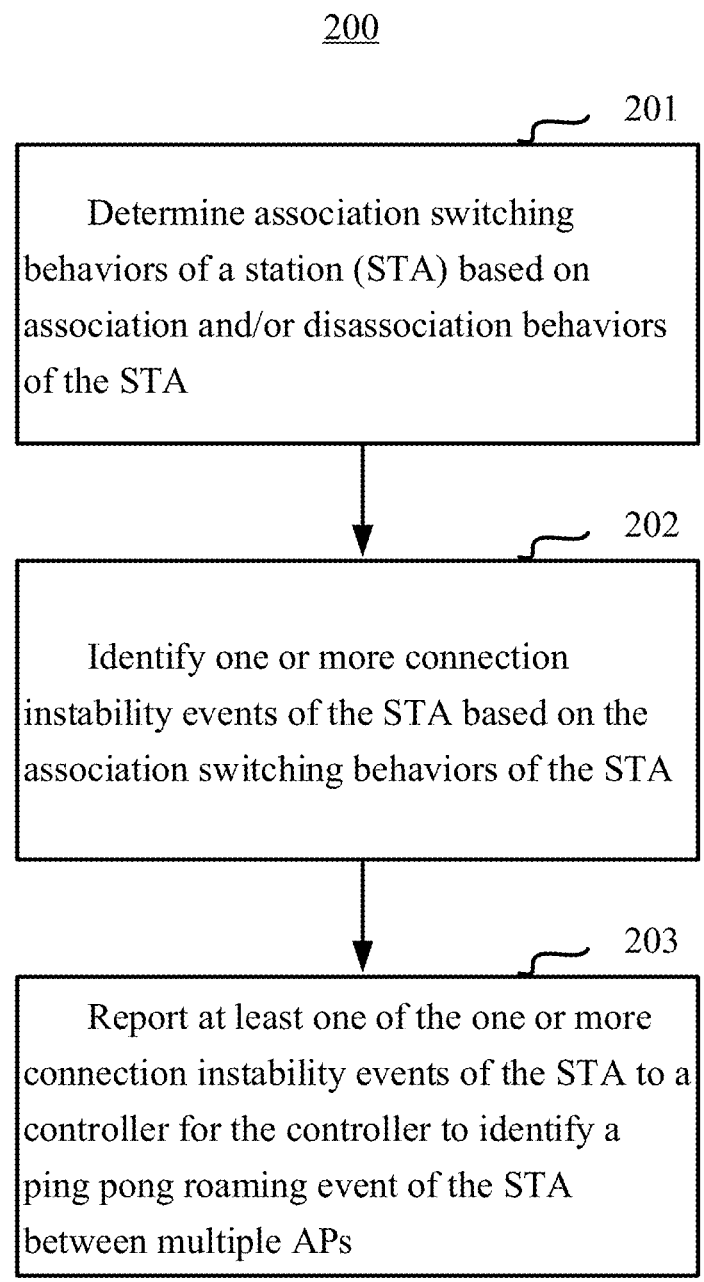
FIG. 2 shows an exemplary flow chart of a method for ping pong roaming control performed by an AP according to at least one embodiment of the present disclosure.

FIG. 2 shows an exemplary flow chart of a method 200 for ping pong roaming control performed by an AP according to at least one embodiment of the present disclosure.

As shown in FIG. 2, the method 200 includes steps 201, 202 and 203.

At step 201, the AP may determine association switching behaviors of a STA based on association and/or disassociation behaviors of the STA.

The association switching behaviors may indicate association after disassociation, or disassociation (after association).

The association and/or disassociation behaviors include a disassociation behavior and an association behavior between the STA and the current AP, or may also include a disassociation behavior between the STA and the current AP and an association behavior between the STA and another AP, or may include just a disassociation behavior of the STA from the current AP.

The manner for judging whether the STA is associated with or disassociated from the AP includes, but is not limited to, one of the following manners that: the AP judges whether related information of the STA (such as a name of an interface where the STA is currently located) has a change that the name of the interface where the STA is currently located is changed to a name of another interface related to another AP, by looking at a forwarding database (FDB) for judging a disassociation or/and an association; or an AP reports that information about the STA to the controller when the STA is associated with the AP, and the controller forwards the information to the original AP with which the STA was associated for judging a disassociation or/and an association. Other conditions may be available, and details are omitted herein.

At step 202, the AP may identify one or more connection instability events of the STA based on the association switching behaviors of the STA.

The connection instability event may indicate that an instability phenomenon of the STA's connection(s) with one or more APs and disconnection(s) from one or more APs. Since a ping pong roaming phenomenon is mainly caused by the STA's frequent and instable connection(s) and disconnections with and from one or more APs, the connection instability event may be at least a factor to be considered when identifying the ping pong roaming phenomenon.

In at least one embodiment, the step 201 may include: determining one of the association switching behaviors of the STA in response to that: the STA associates with a first AP different from the AP within a first time period after the STA disassociates from the AP; the STA associates with the AP within a second time period after the STA disassociates from the AP; or the STA disassociates from the AP. To be noted that the first time period and the second time period may be the same or different.

The step 202 may further include identifying one of the one or more connection instability events of the STA in response to that: a number of the association switching behaviors of the STA occurring within a third time period is greater than a first number threshold (which may mean that there is no requirement on a time interval between the association and the disassociation of the STA); or a number of the association switching behaviors of the STA occurring within a fourth time period starting from when the STA associates with the AP is greater than a second number threshold (which may mean that there is an requirement on a time interval between the association and the disassociation of the STA). These behaviors can indicate that the association switching behaviors of the STA occurs very frequently, which may be a hint for identifying a ping pong roaming event. To be noted that the third time period and the fourth time period may be the same or different, and the first number threshold and the second number threshold may be the same or different.

At step 203, the AP may report at least one of the one or more connection instability events of the STA to a controller for the controller to identify a ping pong roaming event of the STA between multiple APs.

According to the at least one embodiment, the AP undertakes a part of ping pong roaming identification work, that is, at least determining association switching behaviors of a STA based on association and/or disassociation behaviors of the STA, identifying one or more connection instability events of the STA based on the association switching behaviors of the STA and reporting the connection instability event(s) of the STA(s) to the controller, instead of directly reporting associations and/or disassociations of the STA, which can more promptly provide more information for the controller to more accurately identify a ping pong roaming phenomenon, and reduce the operating burden and time delay for the controller to identify the ping pong roaming phenomenon.

Figure 3:
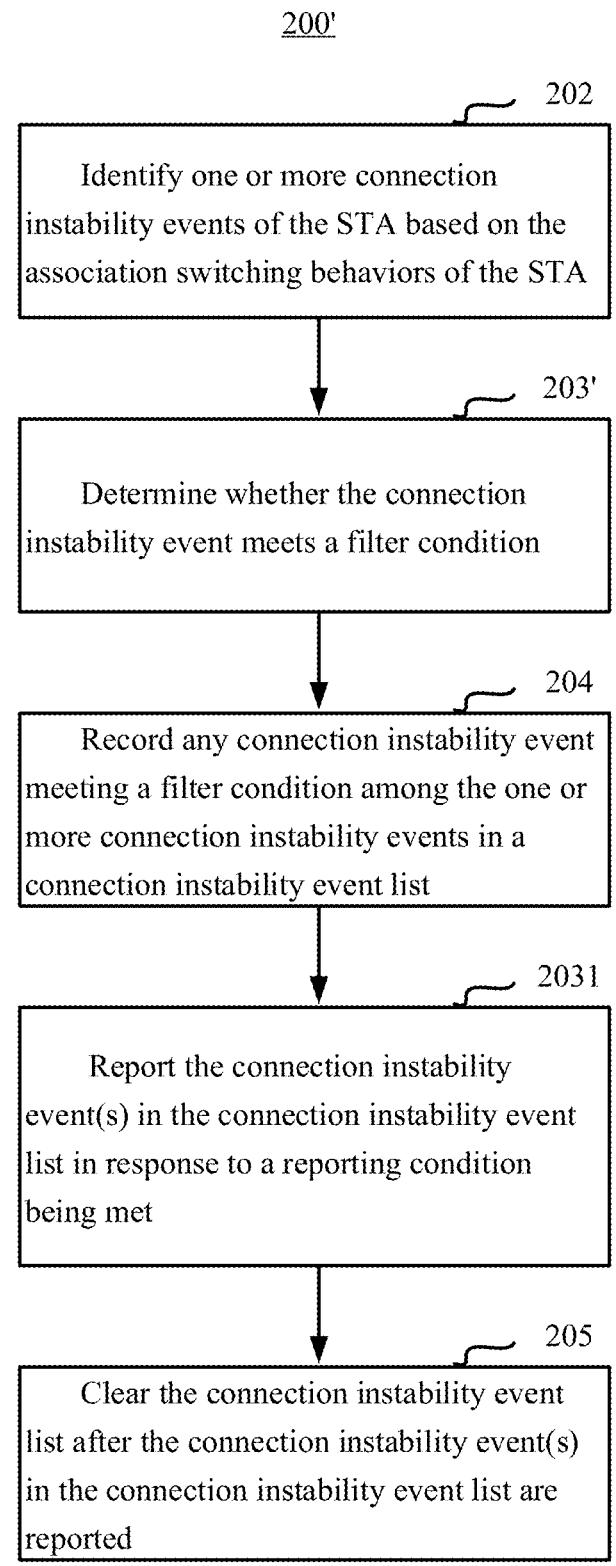
FIG. 3 shows another exemplary flow chart of a method for ping pong roaming control performed by an AP according to at least one embodiment of the present disclosure.

FIG. 3 shows another exemplary flow chart of a method 200' for ping pong roaming control performed by an AP according to at least one embodiment of the present disclosure.

As shown in FIG. 3, in at least one embodiment, the method 200' may include steps 201 (not shown), 202, 203', 204, 2031 (which may be included in step 203 of FIG. 2), and 205.

As shown in FIG. 3, after step 201 (not shown in FIG. 3), at step 202, similar to FIG. 2, the AP identifies one or more connection instability events of the STA based on the association switching behaviors of the STA.

At step 203', it is determined whether the connection instability event meets a filter condition. In at least one embodiment, the filter condition may include one or more of: a condition 1 in which the connection instability event occurs within a weak signal area; a condition 2 in which the connection instability event occurs during the STA is stationary or moves within a small area; or a condition 3 in which the connection instability event is not caused by basic service set (BSS) transition management (BTM).

To be specific, the condition 1 may be a condition in which the connection instability event occurs within a first area, herein the first area is an area in which an average value of received signal strength indicators (RSSIs) for the association switching behaviors corresponding to the connection instability event is lower than a first RSSI threshold; or the first area is an area in which every of the RSSIs for the association switching behaviors corresponding to the connection instability event is lower than a second RSSI threshold In condition 1, the above first area may be called a weak signal area. Normally, the connection instability event does not occur in a strong signal area (in which the RSSI should be stronger), so if the determined connection instability event occurs in a strong signal area, such determined connection instability event may be wrongly determined and may not be considered when identifying ping pong roaming. For example, the determined connection instability event may be caused by a user manually turning off the wireless fidelity (WIFI) function and turning on the WIFI function in a strong signal area, which should not be considered as a ping pong roaming event, and may not be dealt with.

To be noted that the RSSI(s) for the association switching behavior(s) corresponding to the connection instability event means the RSSI(s) of the signals received at an AP from the STA or the signals received at the STA from the AP, immediately before the disassociations of the STA from the AP, which disassociations are included in the association switching behaviors based on which the connection instability event is identified. The disassociations for the association switching behaviors corresponding to the connection instability event may be disassociations included in the association switching behaviors based on which the connection instability event is identified. That is, if a specific connection instability event is identified based on some specific association switching behaviors which are frequent, the specific association switching behaviors each may include a specific association and a specific disassociation or merely a specific disassociation, so the disassociations corresponding to the specific connection instability event may be the specific disassociations included in the specific association switching behaviors.

To be specific, the condition 2 may be a condition in which the connection instability event occurs while an RSSI standard deviation for each of the association switching behaviors of the STA corresponding to the connection instability event is lower than a first RSSI standard deviation threshold, or an average value of the RSSI standard deviations for the association switching behaviors of the STA corresponding to the connection instability event is lower than a second RSSI standard deviation threshold.

In condition 2, the second area is a small area. If the STA moves in a large area (in which the RSSI standard deviation should be higher), the disassociation and reassociation may occur normally because the distance between the STA and the AP(s) changes greatly, and such connection instability event may be a normal phenomenon, and may not be dealt with.

To be noted that the RSSI standard deviation for the association switching behavior of the STA corresponding to the connection instability event may mean the RSSI standard deviation of the signals received at an AP from the STA or the signals received at the STA from the AP, immediately before the disassociations of the STA from the AP included in the association switching behaviors based on which the connection instability event is identified.

The RSSI standard deviation of an association switching behavior refers to calculating the standard deviation of an RSSI by using multiple RSSIs obtained from recent multiple periodic samplings on the received signal by the STA or the AP at the time when the disassociation behavior corresponding to the association switching behavior occurs. It should be noted that the times of the recent multiple periodic samplings may be a preset parameter, such as the recent four RSSI periodic samplings; in addition, the period for the samplings may be also another preset parameter, such as sampling the RSSI every two seconds.

For example, the occurrence time of a disassociation behavior corresponding to a certain association switching behavior is 30 s, and the RSSI standard deviation is calculated by using the recent four periodic RSSI samples, and the period for the samplings of RSSI is 2 s, and assuming that the sampling time of RSSI is 23 s, 25 s, 27 s and 29 s in turn, the RSSI standard deviation of the association switching behavior is based on the four RSSIs obtained from recent multiple periodic samplings on the received signal by the STA or the AP that are carried out at 23 s, 25 s, 27 s and 29 s.

To be specific, the condition 3 may be a condition in which the connection instability event is not caused by basic service set (BSS) transition management (BTM). To be noted that meeting the condition 3 is to process only the ping pong roaming phenomenon not caused by passive roaming recommended by the BTM.

The condition 1, condition 2 and/or condition 3 may be combined so that the connection instability events meeting one or more of the condition 1, condition 2 and/or condition 3 will be obtained, while removing unqualified connection instability events not meeting the condition(s).

Thus, unqualified connection instability events may be filtered out by the AP based on the filter condition to increase the identification accuracy of the ping pong roaming (performed by the controller).

At step 204, the AP may record any connection instability event meeting a filter condition among the one or more connection instability events in a connection instability event list. The connection instability event list may be stored in a storage in the AP, but this is not limited herein.

In at least one embodiment, the recording the connection instability event meeting the filter condition in a connection instability event list comprising recording one or more of: a media access control (MAC) address of the STA; a continuously accumulated number of the connection instability event(s) of the STA; a frequency band of a latest association switching behavior corresponding to a latest connection instability event of the STA; an average RSSI of the association switching behavior(s) corresponding to the latest connection instability event of the STA; a basic service set identifier (BSSID) of the latest association switching behavior corresponding to the latest connection instability event of the STA; a service set identifier (SSID) of the latest association switching behavior corresponding to the latest connection instability event of the STA; or a time stamp of the latest connection instability event of the STA. The above contents may help determine whether two or more connection instability events are the same one connection instability event and remove the redundant connection instability event(s).

To be noted that in the above recorded content, the connection instability event(s) of the STA are accumulated before the connection instability event list is cleared to obtain the accumulated number of the connection instability event(s) of the STA, and the frequency band/BSSID/SSID of a latest association switching behavior corresponding to a latest connection instability event of the STA means the frequency band/BSSID/SSID of the disassociation included in the latest association switching behavior based at least on which the latest connection instability event is identified. Of course, the above contents to be recorded are only examples, and are not limited. Other contents may also be recorded, which will not be exemplified in details herein.

At step 2031, the AP may report the connection instability event(s) in the connection instability event list to the controller in response to a reporting condition being met. In at least one embodiment, the reporting condition may include one or more of: a reporting period being reached (for example, when a timer is expired, and the reporting period may be a fixed period or a flexible period); one of the one or more connection instability events of the STA being identified (for example, the connection instability event(s) is reported once it is identified that the connection instability event of the STA occurs); or an instruction for reporting the connection instability event being received (for example, from the controller or other devices) (for example, the controller or other devices may control the timing for the AP to report the connection instability event(s) by sending an instruction). These reporting conditions are merely examples, and are not limited. Two or three reporting conditions may be combined so that when the two or three reporting conditions are both or all satisfied, the connection instability event(s) in the connection instability event list is(are) reported.

At step 205, the connection instability event list may be cleared after the connection instability events in the connection instability event list are all reported. After that, newly identified connection instability events can be recorded in the cleared connection instability event list, so that no redundant connection instability events can be reported again.

Thus, according to the embodiments, the AP can report qualified connection instability event(s) which are helpful for more accurately identifying ping pong roaming phenomenon so that proper processes can be determined and executed to avoid the ping pong roaming phenomenon.

After the AP report qualified connection instability event(s) to the controller, the controller may identify the ping pong roaming, determine the ping pong roaming processing strategy, and transmit a ping pong roaming processing related instruction to the AP or another or other AP(s). Details for the steps of the controller will be described in details later.

After the AP receives the ping pong roaming processing related instruction, the ping pong roaming processing operations may be performed by the AP, and the details will be described below.

Figure 4:
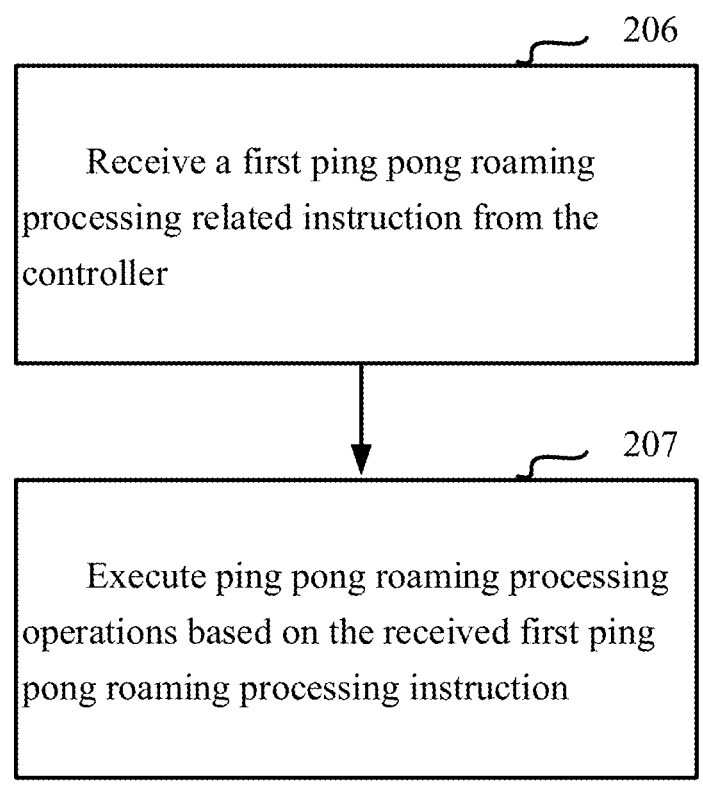
FIG. 4 shows an exemplary flow chart of executing ping pong roaming processing operations steps of the method for ping pong roaming control performed by an AP according to at least one embodiment of the present disclosure.

FIG. 4 shows an exemplary flow chart of executing ping pong roaming processing operations steps of the method 200/200' for ping pong roaming control performed by an AP according to at least one embodiment of the present disclosure.

As shown in FIG. 4, the method 200/200' further includes a step 206 of receiving a first ping pong roaming processing related instruction from the controller; and a step 207 of executing ping pong roaming processing operations based on the received first ping pong roaming processing instruction.

In at least one embodiment, the method further includes: receiving an instruction for modifying parameters for determining the association switching behaviors and/or identifying the one or more connection instability events of the STA; and modifying the parameters. The parameters may include parameters related to determination of the association switching behaviors and/or identification of the connection instability events, such as the thresholds mentioned above, the options of any conditions mentioned above, and so on. Thus, it is possible to control the sensitivity or accuracy of identification of connection instability events and/or identification of association switching behaviors, as a result, the sensitivity or accuracy of identification of ping pong roaming events can be indirectly controlled.

In at least one embodiment, the ping pong roaming processing operations may include one or more of: increasing or decreasing transmission power of the AP; turning on or turning off an access control of the AP for the STA to forbid or to allow the AP to respond to the STA's access request(s); turning on or turning off a sticky control of the AP for the STA to keep or not to keep the STA to be able to associated with the AP more stable; or turning on or turning off a roaming control of the AP for the STA to exclude or not to exclude target APs to be recommended by the AP to be associated with to make sure that the STA will not be or can be recommended to be associated with the excluded target APs (e.g. the APs which turn on access control for the STA as described above).

In at least one embodiment, increasing transmission power of the AP may make the AP be more easily to be associated with the STA, so that the STA may not easily disassociate from the AP, so as to try to avoid ping-pang roaming phenomenon. Decreasing the transmission power of the AP so that the AP may have a lower power to be easily disassociated from the STA or never associated with the STA, so as to try to avoid ping-pang roaming phenomenon too. The increasing or decreasing step value for increasing or decreasing the transmission power of the AP can be adjusted.

In at least one embodiment, turning on the access control may mean that the AP is not allowed to respond to some specific frames from the STA in a certain condition, so that the AP may be not allowed to be accessed by the STA, avoiding the association between the AP and the STA, so as to try to avoid ping-pang roaming phenomenon. The specific frame herein may include, but are not limited to, a probe request frame, an authentication request frame, an association request frame and a reassociation request frame. The certain condition may include, but are not limited to, that the RSSI of the specific frame sent by the STA received by the AP is less than or equal to a preset RSSI threshold; and the preset RSSI threshold may be: the average RSSI of multiple association switching behaviors corresponding to the latest connection instability event of the STA.

Turning on the sticky control may mean making the STA more inclined to keep the association with the current AP under certain conditions rather than roaming to other APs. That is, it is forbidden to kick out (or disassociate) the STA due to roaming stickiness, that is, it is not forced to kick out (or disassociate) the STA after recognizing that the STA is in a sticky state.

Turning on the roaming control may mean that the passive roaming behavior of the STA is restricted to a certain extent by excluding target APs to be recommended by the AP to make sure that the STA will not be recommended to be associated with the excluded target APs, including but not limited to: prohibiting other APs from carrying information about the excluded target APs in the BSS Transition Candidate List Entries field of a BTM request message sent to the STA; and/or letting other APs exclude the target APs when selecting the roaming target according to roaming algorithm. The target APs may be the APs which turn on access control.

Thus, according to the embodiments, the ping pong roaming phenomenon of the STA can be controlled or avoided, so as to solve the problems of frequent association switching, disconnection, packet loss, poor network connection stability and so on, and then improve the user experience.

Figure 5:
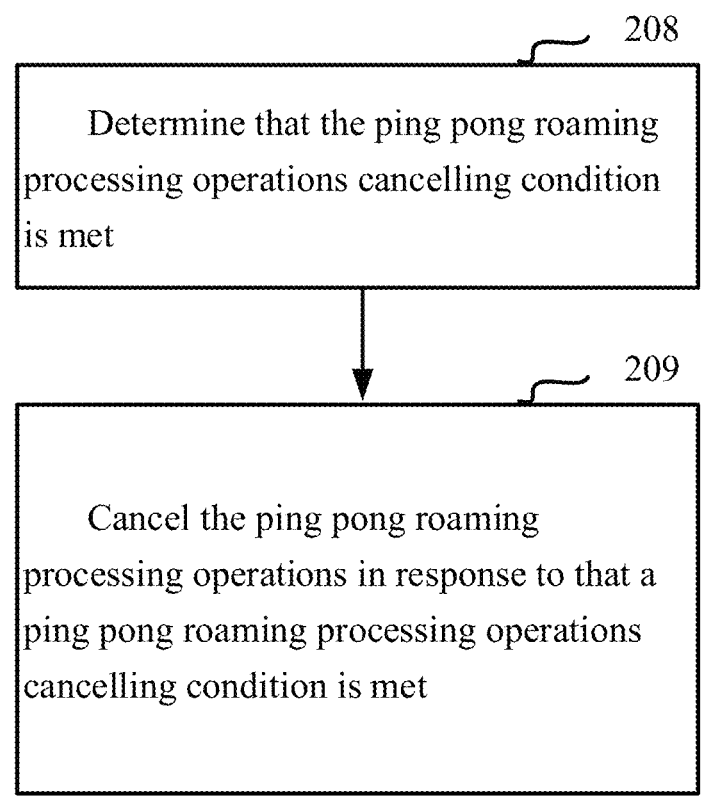
FIG. 5 shows an exemplary flow chart of ping pong roaming processing operations cancelling steps of the method for ping pong roaming control performed by an AP according to at least one embodiment of the present disclosure.

FIG. 5 shows an exemplary flow chart of ping pong roaming processing operations cancelling steps of the method 200/200' for ping pong roaming control performed by an AP according to at least one embodiment of the present disclosure.

As shown in FIG. 5, the method 200/200' may further include a step 208 of determining that the ping pong roaming processing operations cancelling condition is met; and a step 209 of cancelling the ping pong roaming processing operations in response to that a ping pong roaming processing operations cancelling condition is met.

To be noted that the step 208 of determining whether the ping pong roaming processing operations cancelling condition is met and other steps related to the ping pong roaming processing operations cancelling may be performed by the AP, or by another AP, or by the controller, or by the user, which is not limited herein. FIG. 5 shows that the determining whether the ping pong roaming processing operations cancelling condition is met is performed by the AP, but if the determining whether the ping pong roaming processing operations cancelling condition is met is not performed by the AP, then the step 208 may be omitted.

In at least one embodiment, it may be determined that the ping pong roaming processing operations cancelling condition is met in response to that: an accumulated time period for execution of the ping pong roaming processing operations is longer than a cancelling time threshold and a ping pong roaming processing operations non-extension condition is met. To be noted that if it is the AP which determines whether the ping pong roaming processing operations cancelling condition is met, the AP accumulates the time period from a timing at which the AP starts to execute the ping pong roaming processing operations, while if it is the controller which determines whether the ping pong roaming processing operations cancelling condition is met, the controller accumulates the time period from a timing at which the controller transmits the ping pong roaming processing instruction. In other words, if the accumulated time period for execution of the ping pong roaming processing operations is longer than a cancelling time threshold and a ping pong roaming processing operations non-extension condition is not met, then the ping pong roaming processing operations can be extended for the cancelling time threshold. That is, the length of the accumulated time period for execution of the ping pong roaming processing operations can be reset to 0.

To be noted that the ping pong roaming processing operations non-extension condition may be that the number of specific frames accumulatively received by the AP from the STA within a sixth time period is greater than a third number threshold, and/or the absolute value of the difference between the average RSSI of all specific frames received by AP from STA within the past sixth time period and the average RSSI of multiple association switching behaviors corresponding to the latest connection instability event of the STA is less than or equal to a first RSSI different threshold. The specific frame may include, but are not limited to, a probe request frame, an authentication request frame, an association request frame and a reassociation request frame.

In at least one embodiment, it may be determined that the ping pong roaming processing operations cancelling condition is met in response to that: the STA leaves an area in which a ping pong roaming event is identified.

In at least one embodiment, it may be determined that the STA leaves an area in which a ping pong roaming event is identified, in response to one or more of conditions that: an AP or a plurality of APs occurring ping pong roaming do not receive a specific frame from the STA within a leaving-area time threshold; a time period for which the STA disassociates from an AP or a plurality of APs occurring ping pong roaming is longer than a disassociation time threshold; the STA enters a third area of an AP or a plurality of APs, herein the third area is an area in which the AP or the plurality of APs detect that the STA remains associated with the AP or the plurality of APs and a continuously accumulated number of times when an RSSI of the STA sampled periodically is greater than a third RSSI threshold is greater than or equal to a first time number threshold; a continuously accumulated number of times when a first difference is greater than a second RSSI difference threshold is greater than or equal to a second time number threshold within a fifth time period, wherein the first difference is an absolute difference between an RSSI of a specific frame received from the STA and an average value of the RSSIs of a plurality of association switching behaviors corresponding to the latest connection instability event of the STA; or the STA remains associated with the AP and a continuously accumulated number of times when a second difference is greater than a third RSSI difference threshold is greater than or equal to a third time number threshold, herein the second difference is an absolute difference between an RSSI of the STA sampled periodically and an average value of the RSSIs of a plurality of association switching behaviors corresponding to the latest connection instability event of the STA.

To be noted that the specific frame herein may include, but are not limited to, a probe request frame, an authentication request frame, an association request frame and a reassociation request frame. Since the AP may be disassociated from the STA, only some specific frames can be received from the STA, thus the RSSI of the specific frame received from the STA is considered. The average value of the RSSIs of a plurality of association switching behaviors corresponding to the latest connection instability event of the STA means also the average value of the RSSIs received immediately before a plurality of disassociations included in the association switching behaviors based on which the latest connection instability event of the STA is identified.

To be noted that the first time number threshold, the second time number threshold and third time number threshold may be the same or different. The first RSSI threshold, the second RSSI threshold, and the third RSSI threshold may be the same or different. The first time period, the second time period, the third time period, the fourth time period, the fifth time period, and the sixth time period may be the same or different. The first RSSI difference threshold, the second RSSI difference threshold, and the third RSSI difference threshold may be the same or different. The first number threshold, the second number threshold and the third number threshold may be the same or different.

In at least one embodiment, it may be determined that the ping pong roaming processing operations cancelling condition is met in response to that: a transmission power change of the AP is larger than a power change threshold. The transmission power change of the AP may be caused due to non-ping pong roaming processing operations. In this case, if the AP's power change is large, this means that the AP may be not suitable to execute the ping pong roaming processing operations, then the ping pong roaming processing operations should be cancelled.

In at least one embodiment, it may be determined that the ping pong roaming processing operations cancelling condition is met in response to that: another ping pong roaming event of the STA occurs between multiple APs. This means that the ping pong roaming event of the STA no longer occurs between the original multiple APs, so the ping pong roaming processing of the current AP can be cancelled.

In at least one embodiment, it may be determined that the ping pong roaming processing operations cancelling condition is met in response to that: a user cancels the execution of the ping pong roaming processing operations; or a user turns off the function of the ping pong roaming control. In this case, the cancelling is controlled by the user.

In at least one embodiment, it may be determined that the ping pong roaming processing operations cancelling condition is met in response to that the AP is power off. If the AP is powered off, it means that the STA can no longer associate with the powered-off AP, so the STA that previously suffered ping pong roaming may no longer suffer ping pong roaming, so it is necessary to cancel the ping pong roaming processing operations related to the powered-off AP.

In at least one embodiment, it may be determined that the ping pong roaming processing operations cancelling condition is met in response to that the connection between the AP and the controller is lost for a given time. The identification and processing of ping pong roaming depends on the interaction between the controller and the AP. If the connection between the controller and the AP is disconnected for more than the given time, it can be considered that the controller and the AP are disconnected, so the instructions related to ping pong roaming processing (such as canceling ping pong roaming processing operations and performing ping pong roaming processing operations) cannot be exchanged between the controller and the AP. Therefore, the ping pong roaming control of the AP becomes uncontrollable, and the new ping pong roaming event related to the AP cannot be identified, so it is necessary to cancel the ping pong roaming processing operations related to the AP.

To be noted that the above exemplified ping pong roaming processing operations cancelling conditions can be applied alone or in combination.

Thus, the ping pong roaming processing may be cancelled properly based on the above ping pong roaming processing operations cancelling condition(s).

In at least one embodiment, the AP may transmit a second ping pong roaming processing related instruction to the controller. The second ping pong roaming processing related instruction may include one or more of: an instruction for the controller to update a ping pong roaming table for removing records about the cancelled ping pong roaming processing operations recorded in the ping pong roaming table; or an instruction for the controller to transmit an instruction (i.e. fourth ping pong roaming processing related instruction) to other AP(s) related to the removed records described above to execute ping pong roaming processing operations (e.g. cancelling the current ping pong roaming processing operations related to the removed records described above, or performing new ping pong roaming processing operations). For example, a ping pong roaming event of the STA occurs among AP1, AP2 and AP3. When the AP1 judges that the ping pong roaming processing operations needs to be cancelled, then a second ping pong roaming processing related instruction may be reported to the controller, so that the controller may send the fourth ping pong roaming processing related instruction, which is forwarded to the AP2 and the AP3, so that the AP2 and the AP3 can perform ping pong roaming processing operations (such as cancelling the current ping pong roaming processing operations or executing new ping pong roaming processing operations).

The ping pong roaming table may be stored in the controller, but not limited herein, and the ping pong roaming table can be stored in other places. Contents stored in the ping pong roaming table may include, but are not limited to, a MAC address of the STA where ping pong roaming occurs and a MAC address of the related AP(s), and the operations of the ping pong roaming processing that the AP needs to perform. The manners for updating of the ping pong roaming table may include: adding content to the ping pong roaming table, deleting content from the ping pong roaming table, and/or adding and deleting content at the same time. To be noted that the ping pong roaming table stores identifiers of the STA and the AP that are currently experiencing ping pong roaming, and the operations of the ping pong roaming processing that need to be executed or are being executed for each currently occurring ping pong roaming event; and the ping pong roaming table can be maintained and updated by the controller, or by respective APs, or at both the controller and the respective APs. If the AP/controller does not maintain the ping pong roaming table, steps related to the ping pong roaming table may not be performed by the AP/controller, and may be omitted.

The instruction for other APs to execute ping pong roaming processing operations may instruct other APs to execute ping pong roaming processing operations such as power adjustment, access control, sticky control and roaming control.

Thus, according to embodiments, the ping pong roaming phenomenon of an STA roaming back and forth between multiple APs due to first-disassociation-then-reassociation, active roaming, passive roaming and/or other reasons can be identified and dealt with, so as to solve the problems of frequent association switching, disconnection, packet loss, poor network connection stability and the like, and further improve the user experience.

Figure 6:
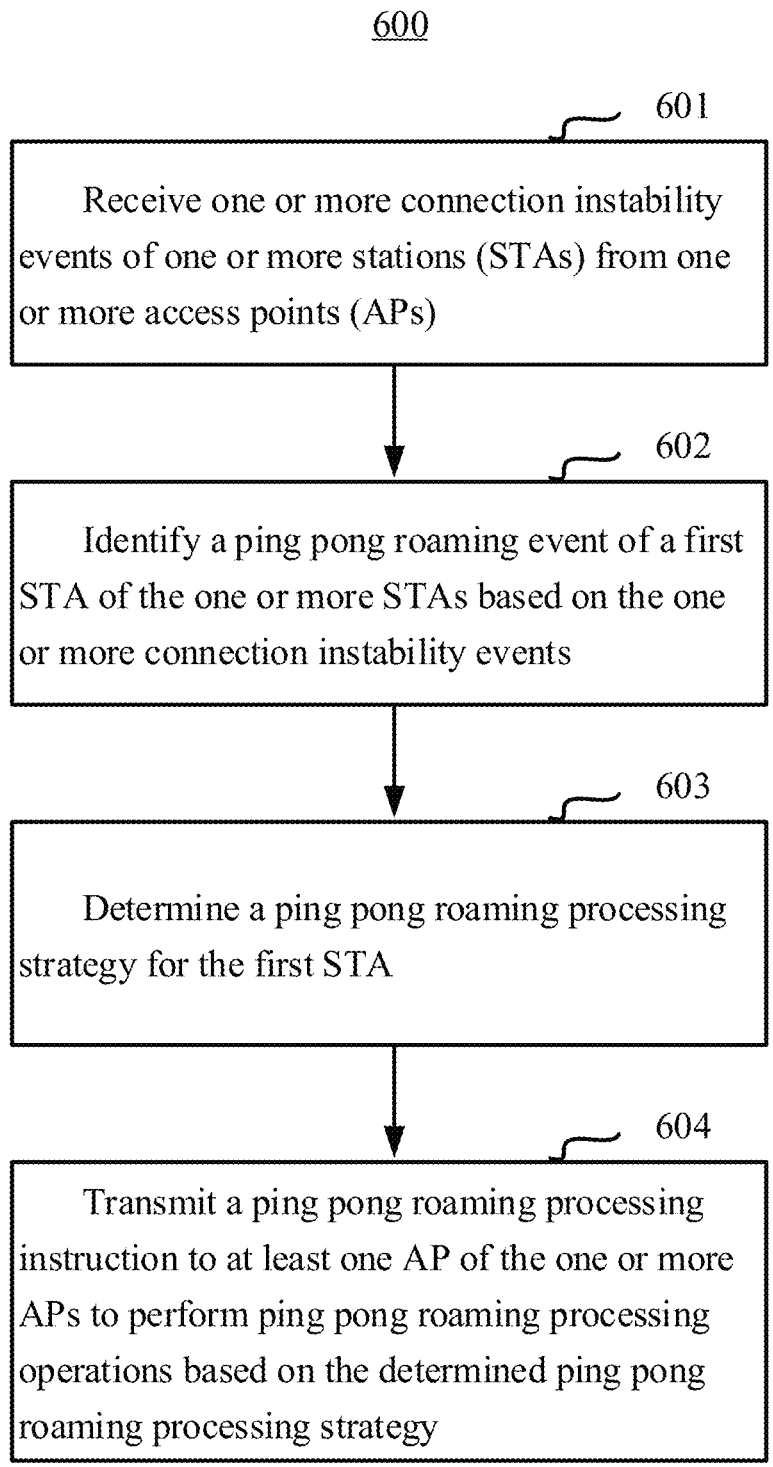
FIG. 6 shows an exemplary flow chart of a method for ping pong roaming control performed by a controller according to at least one embodiment of the present disclosure.

FIG. 6 shows an exemplary flow chart of a method 600 for ping pong roaming control performed by a controller according to at least one embodiment of the present disclosure.

The method 600 may include steps 601, 602, 603 and 603.

At step 601, the controller receives one or more connection instability events of one or more STAs from one or more APs, after the one or more APs report their connection instability events to the controller.

At step 602, the controller identifies a ping pong roaming event of a first STA of the one or more STAs based on the one or more connection instability events.

In at least one embodiment, the step 602 of identifying a ping pong roaming event of a first STA of the one or more STAs based on the one or more connection instability events may include identifying a ping pong roaming event of a STA in response to one or more of: a condition (1) in which there are a plurality of APs reporting two or more connection instability events of the first STA (which means that there are at least two APs that reported the connection instability event of the first STA, and each AP reported at least one connection instability event of the first STA), and a time interval between any two consecutive connection instability events from different APs of the two or more connection instability events is shorter than a first time interval threshold; a condition (2) in which there are a plurality of APs reporting two or more connection instability events of the first STA, and a time interval between two consecutive connection instability events from different APs of the two or more connection instability events is shorter than a second time interval threshold; or a condition (3) in which an AP reports a connection instability event of the first STA. The condition (1) indicates very frequent connection instability events for one STA, and the condition (2) indicates relatively frequent connection instability events for one STA, and the condition (3) indicates that once there is an AP reporting a connection instability event for one STA, the ping pong roaming event is identified. To noted that the first time interval threshold and the second time interval threshold may be the same or different. To be noted that SSIDs of the two consecutive connection instability events from different APs may be the same or different, and there is no limitation on this.

At step 603, the controller determines a ping pong roaming processing strategy for the first STA. In at least one embodiment, the determining a ping pong roaming processing strategy for the first STA is performed based on attributes of the one or more connection instability events of the one or more STAs and/or wireless specification or radio frequency parameters of the one or more APs. In at least one embodiment, the ping pong roaming processing strategy may include: which AP(s) need to execute ping pong roaming processing operations; and/or operations of the ping pong roaming processing for each AP which needs to execute the ping pong roaming processing operations. Since the ping pong roaming may result in frequent association and disassociation of the STA with and from the AP(s), in order to avoid the ping pong roaming, it is necessary to try to make the STA stay associated or connected with one AP, and prevent the STA from associating or connecting with another AP. It is necessary to determine which AP(s) to allow association or connection of the STA, and which AP(s) to avoid association or connection of the STA, and particularly how to allow or avoid the association or connection, for example, access control or transmission power change, so that an AP may be not allowed to be accessed by the STA or an AP may have a larger transmission power to be more easily associated or connected with the STA.

In some embodiments, the determining a ping pong roaming processing strategy for the first STA may be performed based on attributes of the one or more connection instability events of the one or more STAs reported by the AP(s) and/or wireless specification or radio frequency parameters of the AP(s). For example, if the frequency band of a specific AP is low, the RSSI of the specific AP is low, and/or the phenomenon of unstable connection of the specific AP occurs later (that is, recently), then a specific AP may be determined to perform access control, that is, the STA may be not allowed to access the AP because the AP's signal is worse. However, if the AP itself has a lower transmission power, and/or a narrower bandwidth, the AP may be determined to perform access control to forbid access, that is, it does not allow the STA to access the AP. While the other AP may be determined to increase its transmission power, so that the STA can be easily connected to the other AP as much as possible without switching association between the APs. In all, the AP(s) with poorer wireless capability may be forbidden to be associated with the STA by decreasing transmission power, and/or turning on an access control, and/or turning off a sticky control, and/or turning off a roaming control (because there is no need to exclude target APs to be associated with the STA), while the AP(s) with better wireless capability may be kept to be associated with the STA by increasing transmission power, and/or turning off an access control, and/or turning on a sticky control, and/or turning on a roaming control to exclude target APs (in which the target APs turn on the access control) to be associated with the STA, so as to try to keep the STA associated with the AP(s) with better wireless capability as long as possible, so as to avoid ping pong roaming phenomenon.

At step 604, the controller transmits a ping pong roaming processing instruction to at least one AP of the one or more APs to perform ping pong roaming processing operations based on the determined ping pong roaming processing strategy.

In at least one embodiment, the ping pong roaming processing operations may include one or more of: increasing or decreasing transmission power of the AP; turning on or turning off an access control of the AP for the STA to forbid or to allow the AP to respond to the STA's access request(s); turning on or turning off a sticky control of the AP for the STA to keep or not to keep the STA to be able to associated with the AP more stable; or turning on or turning off a roaming control of the AP for the STA to exclude or not to exclude target APs to be recommended by the AP to be associated with to make sure that the STA will not be or can be recommended to be associated with the excluded target APs (e.g. the APs which turn on access control for the STA as described above). The details for the ping pong roaming processing operations are described above, and will be omitted here.

For example, the controller may transmit a ping pong roaming processing instruction to instruct an AP to turn on the access control, and transmit another ping pong roaming processing instruction to instruct another AP to increase transmission power, and so on.

In at least one embodiment, the identifying a ping pong roaming event of a first STA of the one or more STAs based on the one or more connection instability events and the determining a ping pong roaming processing strategy for the first STA may be performed periodically or in response to receiving a connection instability event from an AP.

Thus, according to the embodiments, the controller can identify a ping pong roaming event of a STA and make a ping pong roaming processing strategy for the AP(s) to control or avoid the ping pong roaming of the STA, so as to solve the problems of frequent association switching, disconnection, packet loss, poor network connection stability and so on, and then improve the user experience.

Figure 7:
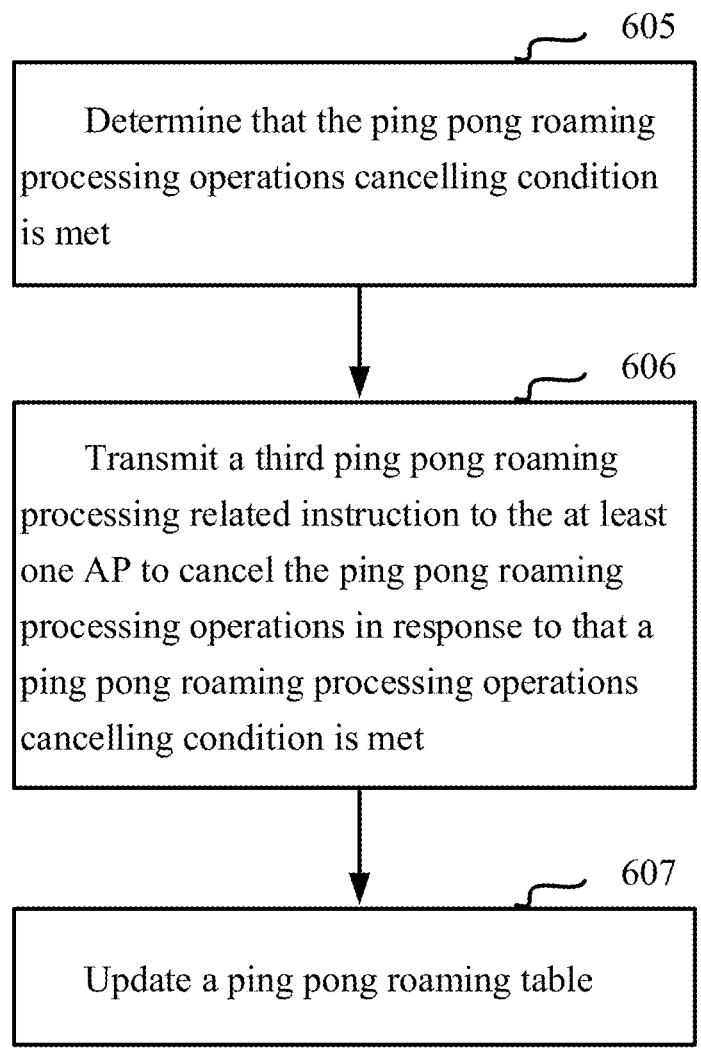
FIG. 7 shows an exemplary flow chart of ping pong roaming process operations cancelling steps of the method for ping pong roaming control performed by a controller according to at least one embodiment of the present disclosure.

FIG. 7 shows an exemplary flow chart of ping pong roaming processing operations cancelling steps of the method 600 for ping pong roaming control performed by a controller according to at least one embodiment of the present disclosure.

As mentioned above, determining whether the ping pong roaming processing operations cancelling condition is met may be performed by the AP, or by another AP, or by the controller, or by the user, which is not limited herein. FIG. 7 shows that the determining whether the ping pong roaming processing operations cancelling condition is met is performed by the controller, but if the determining whether the ping pong roaming processing operations cancelling condition is met is not performed by the controller, then the step 605 may be omitted.

As shown in FIG. 7, the method 600 may further include steps 605, 606 and 607.

At step 605, the controller may determine that the ping pong roaming processing operations cancelling condition is met.

In at least one embodiment, it may be determined that the ping pong roaming processing operations cancelling condition is met in response to one or more of: a cancelling condition that an accumulated time period for execution of the ping pong roaming processing operations is longer than a cancelling time threshold and a ping pong roaming processing operations non-extension condition is met; a cancelling condition that the STA leaves an area in which a ping pong roaming event is identified; a cancelling condition that a transmission power change of the AP is larger than a power change threshold; a cancelling condition that another ping pong roaming event of the STA occurs between multiple APs; a cancelling condition that a user cancels the execution of the ping pong roaming processing operations; a cancelling condition that a user turns off the function of the ping pong roaming control; a cancelling condition that the AP is power off (e.g. the AP is turned off, or all the radios of the AP are turned off); or a cancelling condition that the connection between the AP and the controller is lost for a given time.

In at least one embodiment, it is determined that the STA leaves an area in which a ping pong roaming event is identified, in response to one or more of conditions that: an AP or a plurality of APs occurring ping pong roaming do not receive a specific frame from the STA within a leaving-area time threshold; a time period for which the STA disassociates from an AP or a plurality of APs occurring ping pong roaming is longer than a disassociation time threshold; the STA enters a third area of an AP or a plurality of APs, wherein the third area is an area in which the AP or the plurality of APs detect that the STA remains associated with the AP or the plurality of APs and a continuously accumulated number of times when an RSSI of the STA sampled periodically is greater than a third RSSI threshold is greater than or equal to a first time number threshold; a continuously accumulated number of times when a first difference is greater than a second RSSI difference threshold is greater than or equal to a second time number threshold within a fifth time period, wherein the first difference is an absolute difference between an RSSI of a specific frame received from the STA and an average value of the RSSIs of a plurality of association switching behaviors corresponding to the latest connection instability event of the STA; or the STA remains associated with the AP and a continuously accumulated number of times when a second difference is greater than a third RSSI difference threshold is greater than or equal to a third time number threshold, wherein the second difference is an absolute difference between an RSSI of the STA sampled periodically and an average value of the RSSIs of a plurality of association switching behaviors corresponding to the latest connection instability event of the STA.

To be noted that unless otherwise specified, all the RSSI mentioned in the disclosure may be either uplink RSSI or downlink RSSI. The downlink RSSI may be estimated based on the uplink RSSI, for example, downlink RSSI=uplink RSSI-uplink and downlink signal strength difference offset. The offset may be a fixed value (for example, it may be specified according to experience) or a dynamically changing value (for example, it may be updated by an old offset, or by calculating uplink RSSI and downlink RSSI measured by radio resource management (RRM)).

At step 606, the controller may transmit a third ping pong roaming processing related instruction to the at least one AP to cancel the ping pong roaming processing operations in response to that a ping pong roaming processing operations cancelling condition is met. Herein, the third ping pong roaming processing related instruction may be an instruction for the at least one AP to cancel the ping pong roaming processing operations.

At step 607, the controller may update a ping pong roaming table.

The ping pong roaming table may be stored in the controller, but not limited herein, and the ping pong roaming table can be stored in other places. Contents stored in the ping pong roaming table may include, but are not limited to, a MAC address of the STA where ping pong roaming occurs and a MAC address of the related AP(s), and the operations of the ping pong roaming processing that the AP needs to perform. The manners for updating of the ping pong roaming table may include: adding content, deleting content, and/or adding and deleting content at the same time.

Figure 8:
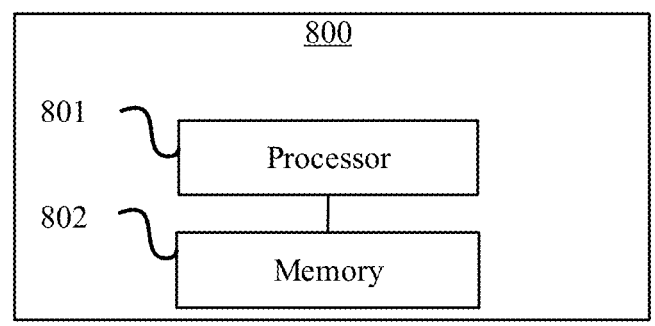
FIG. 8 is an exemplary block diagram illustrating an AP according to at least one embodiment of the present disclosure.

FIG. 8 is an exemplary block diagram illustrating an AP 800 according to at least one embodiment of the present disclosure. It should be noted that the AP 800 depicted in FIG. 8 can be used to process ping pong roaming, for example, respective method 200 or method 200' as described above.

As shown in FIG. 8, the AP 800 can include one or more processors 801 and a memory 802. The one or more processors 801 are communicatively coupled with the memory 802 and configured to perform the methods for ping pong roaming control performed by the AP as discussed above.

Examples of the one or more processors 801 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The one or more processors 801 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 802.

The memory 802 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 802 may reside in the one or more processors 801, external to the one or more processors 801, or distributed across multiple entities including the one or more processors 801. The memory 802 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

Figure 9:
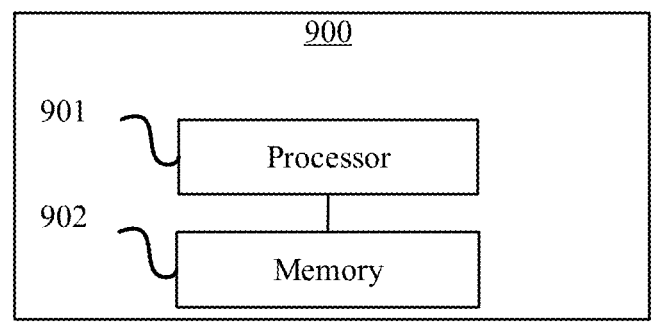
FIG. 9 is an exemplary block diagram illustrating a controller according to at least one embodiment of the present disclosure.

FIG. 9 is an exemplary block diagram illustrating a controller 900 according to at least one embodiment of the present disclosure. It should be noted that the controller 900 depicted in FIG. 9 can be used to process ping pong roaming, for example, respective method 600 as described above.

As shown in FIG. 9, the controller 900 can include one or more processors 901 and a memory 902. The one or more processors 901 are communicatively coupled with the memory 902 and configured to perform the methods for ping pong roaming control performed by the controller as discussed above.

In addition, according to another embodiment of the present disclosure, a computer program product is disclosed. As an example, the computer program product comprises a non-transitory computer readable storage medium having program instructions embodied therewith, and the program instructions are executable by a processor of an AP. When executed, the program instructions cause the processor to perform one or more of the described procedures above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for ping pong roaming control, the method being performed by an access point (AP) and comprising:
   determining association switching behaviors of a station (STA) based on association and/or disassociation behaviors of the STA;
   identifying one or more connection instability events of the STA based on the association switching behaviors of the STA;
   recording any connection instability event meeting a filter condition among the one or more connection instability events in a connection instability event list; and
   reporting at least one of the one or more connection instability events of the STA to a controller for the controller to identify a ping pong roaming event of the STA between multiple APs, wherein the reporting at least one of the one or more connection instability events of the STA to the controller for the controller to identify a ping pong roaming event of the STA between multiple APs comprises reporting the connection instability event(s) in the connection instability event list in response to a reporting condition being met,
   wherein the method further comprises clearing the connection instability event list after the connection instability event(s) in the connection instability event list is(are) reported.

2. The method of claim 1, wherein the determining association switching behaviors of the STA based on association and/or disassociation behaviors of the STA comprises:
   determining one of the association switching behaviors of the STA in response to that:
   the STA associates with a first AP different from the AP within a first time period after the STA disassociates from the AP;
   the STA associates with the AP within a second time period after the STA disassociates from the AP; or
   the STA disassociates from the AP.

3. The method of claim 1, wherein the identifying one or more connection instability events of the STA based on the association switching behaviors of the STA comprises:
   identifying one of the one or more connection instability events of the STA in response to that:
   a number of the association switching behaviors of the STA occurring within a third time period is greater than a first number threshold; or
   a number of the association switching behaviors of the STA occurring within a fourth time period starting from when the STA associates with the AP is greater than a second number threshold.

4. The method of claim 1, wherein the filter condition comprises:
   a condition in which the connection instability event occurs within a first area,
   wherein the first area is an area in which an average value of received signal strength indicators (RSSIs) for the association switching behaviors corresponding to the connection instability event is lower than a first RSSI threshold; or
   the first area is an area in which every of the RSSIs for the association switching behaviors corresponding to the connection instability event is lower than a second RSSI threshold.

5. The method of claim 1, wherein the filter condition comprises:
   a condition in which the connection instability event occurs while an RSSI standard deviation for each of the association switching behaviors of the STA corresponding to the connection instability event is lower than a first RSSI standard deviation threshold, or an average value of the RSSI standard deviations for the association switching behaviors of the STA corresponding to the connection instability event is lower than a second RSSI standard deviation threshold.

6. The method of claim 1, wherein the filter condition comprises:
a condition in which the connection instability event is not caused by basic service set (BSS) transition management (BTM).

7. The method of claim 1, wherein the reporting condition comprises one or more of:
a reporting period being reached;
one of the one or more connection instability events of the STA being identified; or
an instruction for reporting the connection instability event being received.

8. The method of claim 1, further comprising:
receiving a first ping pong roaming processing related instruction from the controller; and
executing ping pong roaming processing operations based on the received first ping pong roaming processing instruction.

9. The method of claim 8, wherein the ping pong roaming processing operations comprises one or more of:
increasing or decreasing transmission power of the AP;
turning on or turning off an access control of the AP for the STA to forbid or to allow the AP to respond to the STA's access request(s);
turning on or turning off a sticky control of the AP for the STA to keep or not to keep the STA to be able to associated with the AP more stable; or
turning on or turning off a roaming control of the AP for the STA to exclude or not to exclude target APs to be recommended by the AP to be associated with the STA.

10. The method of claim 8, further comprising:
cancelling the ping pong roaming processing operations in response to that a ping pong roaming processing operations cancelling condition is met.

11. The method of claim 10, wherein the ping pong roaming processing operations cancelling condition comprises one or more of:
a cancelling condition that an accumulated time period for execution of the ping pong roaming processing operations is longer than a cancelling time threshold and a ping pong roaming processing operations non-extension condition is met;
a cancelling condition that the STA leaves the area in which the ping pong roaming event is identified;
a cancelling condition that a transmission power change of the AP is larger than a power change threshold;
a cancelling condition that another ping pong roaming event of the STA occurs between multiple APs;
a cancelling condition that a user cancels the execution of the ping pong roaming processing operations;
a cancelling condition that a user turns off the function of the ping pong roaming control;
a cancelling condition that the AP is power off, or
a cancelling condition that the connection between the AP and the controller is lost for a given time.

12. An access point (AP) for ping pong roaming control, the AP comprising:
one or more processors;
a memory coupled to at least one of the processors; and
a set of computer program instructions stored in the memory, which, when executed by at least one of the processors, perform actions of:
determining association switching behaviors of a station (STA) based on association and/or disassociation behaviors of the STA;
identifying one or more connection instability events of the STA based on the association switching behaviors of the STA;
recording any connection instability event meeting a filter condition among the one or more connection instability events in a connection instability event list;
reporting at least one of the one or more connection instability events of the STA to a controller for the controller to identify a ping pong roaming event of the STA between multiple APs, wherein the reporting at least one of the one or more connection instability events of the STA to the controller for the controller to identify a ping pong roaming event of the STA between multiple APs comprises reporting the connection instability event(s) in the connection instability event list in response to a reporting condition being met; and
clearing the connection instability event list after the connection instability event(s) in the connection instability event list is(are) reported.

13. The AP according to claim 12, wherein the determining association switching behaviors of the STA based on association and/or disassociation behaviors of the STA comprises:
determining one of the association switching behaviors of the STA in response to that:
the STA associates with a first AP different from the AP within a first time period after the STA disassociates from the AP;
the STA associates with the AP within a second time period after the STA disassociates from the AP; or
the STA disassociates from the AP.

14. The AP according to claim 12, wherein the identifying one or more connection instability events of the STA based on the association switching behaviors of the STA comprises:
identifying one of the one or more connection instability events of the STA in response to that:
a number of the association switching behaviors of the STA occurring within a third time period is greater than a first number threshold; or
a number of the association switching behaviors of the STA occurring within a fourth time period starting from when the STA associates with the AP is greater than a second number threshold.

15. The AP according to claim 12, wherein the set of computer program instructions stored in the memory, when executed by at least one of the processors, further perform actions of:
receiving a first ping pong roaming processing related instruction from the controller; and
executing ping pong roaming processing operations based on the received first ping pong roaming processing instruction.

16. The AP according to claim 15, wherein the ping pong roaming processing operations comprises one or more of:
increasing or decreasing transmission power of the AP;
turning on or turning off an access control of the AP for the STA to forbid or to allow the AP to respond to the STA's access request(s);

turning on or turning off a sticky control of the AP for the STA to keep or not to keep the STA to be able to associated with the AP more stable; or turning on or turning off a roaming control of the AP for the STA to exclude or not to exclude target APs to be recommended by the AP to be associated with the STA.

* * * * *